United States Patent
Colling, Jr. et al.

(10) Patent No.: US 11,202,998 B2
(45) Date of Patent: Dec. 21, 2021

(54) SYSTEMS AND METHODS FOR GAS DISPOSAL

(71) Applicant: Hamilton Sundstrand Corporation, Charlotte, NC (US)

(72) Inventors: Arthur K. Colling, Jr., Monson, MA (US); Benjamin E. Bishop, South Glastonbury, CT (US); Allison B. Thomas, Hampden, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/820,693

(22) Filed: Mar. 16, 2020

(65) Prior Publication Data
US 2020/0261870 A1  Aug. 20, 2020

Related U.S. Application Data

(60) Division of application No. 14/997,287, filed on Jan. 15, 2016, now Pat. No. 10,589,237, which is a
(Continued)

(51) Int. Cl.
*B01F 5/06* (2006.01)
*B01F 5/00* (2006.01)
(Continued)

(52) U.S. Cl.
CPC .......... *B01F 5/0682* (2013.01); *B01F 1/0022* (2013.01); *B01F 1/0027* (2013.01);
(Continued)

(58) Field of Classification Search
CPC .............. B01F 3/04248; B01F 3/04496; B01F 3/04737; B01F 5/0057; B01F 5/0682
(Continued)

(56) References Cited

U.S. PATENT DOCUMENTS

| 2,594,880 A | 4/1952 | Davis |
| 2,921,105 A * | 1/1960 | Benson .................... C08J 3/005 |
| | | 524/315 |

(Continued)

FOREIGN PATENT DOCUMENTS

| EP | 2330029 A2 | 6/2011 |
| NL | 9001805 A | 1/1991 |
| WO | 0136105 A1 | 5/2001 |

OTHER PUBLICATIONS

Partial European Search Report dated Feb. 20, 2017, issued during the prosecution of corresponding European Patent Application No. EP 16191067.4 (7 pages).
(Continued)

*Primary Examiner* — Tony G Soohoo
(74) *Attorney, Agent, or Firm* — Locke Lord LLP; Scott D. Wofsy; Alicia J. Carroll

(57) ABSTRACT

A discharge system includes a mixing vessel and a feedstock input in fluid communication with the mixing vessel. A solvent input is in fluid communication with the mixing vessel. A discharge output is in fluid communication with an outlet of the mixing vessel to discharge effluent. A method for generating turbulence on a liquid surface within a discharge system includes supplying a mixing vessel with feedstock fluid and solvent fluid to generate a liquid mixture and a gas pocket in the mixing vessel. The method includes supplying an impinging solvent fluid through a nozzle extending from a first end of the mixing vessel to generate a roiling surface at an interface between the gas pocket and the liquid mixture and permit uptake of gas from the gas pocket into the liquid mixture.

6 Claims, 2 Drawing Sheets

Related U.S. Application Data continuation-in-part of application No. 14/868,094, filed on Sep. 28, 2015, now Pat. No. 10,300,439.

(51) Int. Cl.
| | | |
|---|---|---|
| *B01F 3/04* | (2006.01) | |
| *B01F 1/00* | (2006.01) | |
| *G05D 21/02* | (2006.01) | |
| *B63G 8/08* | (2006.01) | |
| *F01N 13/12* | (2010.01) | |
| *F01N 3/04* | (2006.01) | |

(52) U.S. Cl.
CPC ...... *B01F 3/04248* (2013.01); *B01F 3/04496* (2013.01); *B01F 3/04737* (2013.01); *B01F 5/0057* (2013.01); *B63G 8/08* (2013.01); *F01N 3/04* (2013.01); *F01N 13/12* (2013.01); *G05D 21/02* (2013.01); *B01F 2201/00* (2013.01)

(58) Field of Classification Search
USPC .......................................... 366/167.1–174.1
See application file for complete search history.

(56) References Cited

U.S. PATENT DOCUMENTS

| | | | | |
|---|---|---|---|---|
| 3,148,948 A * | 9/1964 | Lutz | ....................... | B01D 19/02 23/293 A |
| 3,425,669 A | 2/1969 | Gaddis | | |
| 4,022,694 A | 5/1977 | Fruman | | |
| 4,477,341 A * | 10/1984 | Schweiss | ............... | B03D 1/242 209/170 |
| 4,850,269 A * | 7/1989 | Hancock | ............. | B01F 3/04241 99/323.1 |
| 4,974,375 A * | 12/1990 | Tada | ....................... | B24C 1/003 261/124 |
| 5,332,100 A * | 7/1994 | Jameson | ................ | B03D 1/028 209/164 |
| 5,846,462 A * | 12/1998 | Thompson | ............ | B29C 44/352 264/51 |
| 5,910,248 A | 6/1999 | Tlok | | |
| 6,010,677 A | 1/2000 | Scheybeler | | |
| 6,123,750 A | 9/2000 | Espinal | | |
| 6,156,209 A * | 12/2000 | Kim | ....................... | A01K 63/04 119/263 |
| 6,406,539 B1 | 6/2002 | Shigeto et al. | | |
| 6,712,215 B2 | 3/2004 | Scheybeler | | |
| 6,736,687 B2 | 5/2004 | Hauschildt | | |
| 6,896,819 B2 * | 5/2005 | Morse | ................ | B01D 19/0005 210/188 |
| 7,105,039 B2 | 9/2006 | Decker | | |
| 7,230,034 B2 | 6/2007 | Mohedas et al. | | |
| 7,644,909 B2 * | 1/2010 | Huhta-Koivisto | .... | B01F 5/0268 261/91 |
| 7,802,775 B2 | 9/2010 | Emilsen et al. | | |
| 7,829,750 B2 | 11/2010 | Beech, Jr. et al. | | |
| 8,109,224 B2 | 2/2012 | Abdel-Maksoud et al. | | |
| 8,298,418 B2 * | 10/2012 | Liechti | ................ | B01F 3/04248 210/220 |
| 8,440,006 B2 * | 5/2013 | Laslo | ..................... | B01D 53/40 96/235 |
| 8,800,969 B2 * | 8/2014 | Yousfan | .............. | B01F 3/04106 261/26 |
| 8,865,098 B2 * | 10/2014 | Suchak | .................. | B01D 53/76 423/210 |
| 8,919,743 B2 | 12/2014 | Osborn et al. | | |
| 8,980,085 B1 | 3/2015 | Preiss | | |
| 9,050,557 B1 | 6/2015 | Leppin et al. | | |
| 9,095,826 B2 * | 8/2015 | Kaya | ...................... | B01F 5/0415 |
| 9,545,614 B2 | 1/2017 | Mohr et al. | | |
| 9,617,509 B2 | 4/2017 | Li et al. | | |
| 9,867,493 B2 * | 1/2018 | Novak | .................. | B01F 3/0446 |
| 10,300,439 B2 * | 5/2019 | Bishop | ................ | B01F 1/0038 |
| 10,589,237 B2 * | 3/2020 | Colling, Jr. | ............... | F01N 3/04 |
| 10,898,866 B2 * | 1/2021 | Bishop | ...................... | F01N 9/00 |
| 2001/0000601 A1 * | 5/2001 | Kim | ....................... | A01K 63/04 210/703 |
| 2002/0190404 A1 * | 12/2002 | Baarda | ...................... | B01F 5/20 261/115 |
| 2005/0145498 A1 | 7/2005 | Clark et al. | | |
| 2010/0145248 A1 | 6/2010 | Myrick et al. | | |
| 2010/0200500 A1 | 8/2010 | Rezania et al. | | |
| 2013/0005011 A1 | 1/2013 | Bell et al. | | |
| 2013/0026110 A1 | 1/2013 | Osborn | | |
| 2013/0039810 A1 | 2/2013 | Riechers | | |
| 2014/0311416 A1 | 10/2014 | Stiles, Jr. et al. | | |
| 2015/0031099 A1 | 1/2015 | Li et al. | | |
| 2017/0087525 A1 | 3/2017 | Bishop et al. | | |
| 2020/0254468 A1 * | 8/2020 | Kubota | .................. | B05B 7/1686 |
| 2020/0261870 A1 * | 8/2020 | Colling, Jr. | ......... | B01F 3/04248 |
| 2020/0330934 A1 * | 10/2020 | Al-Anzi | ............ | B01F 15/00902 |

OTHER PUBLICATIONS

Extended European Search Report dated Jun. 9, 2017 issued during the prosecution of European Patent Application No. 16191067.4 (13 pages).

Extended European Search Report dated Jun. 22, 2017 issued during the prosecution of European Patent Application No. 17150810.4 (9 pages).

Communication Pursuant to Artice. 94(3) EPC dated Nov. 18, 2020, issued during the prosecution of European Patent Application No. EP 17150810.4.

\* cited by examiner

SYSTEMS AND METHODS FOR GAS DISPOSAL

CROSS-REFERENCE TO RELATED APPLICATIONS

This application is a divisional of U.S. patent application Ser. No. 14/997,287, filed on Jan. 15, 2016, which is a continuation-in-part of U.S. patent application Ser. No. 14/868,094 filed Sep. 28, 2015 and granted as U.S. Pat. No. 10,300,439, both of which are incorporated by reference herein in their entirety.

STATEMENT REGARDING FEDERALLY SPONSORED RESEARCH OR DEVELOPMENT

This invention was made with government support under contract number NNX085-059 awarded by the United States Navy. The government has certain rights in the invention.

BACKGROUND

1. Field

The present disclosure relates to gas disposal, more specifically to dissolving gas into a liquid for underwater disposal.

2. Description of Related Art

Operation of a vehicle underwater may generate gases that need to be discharged, e.g. disposed of, as an effluent. Generally, during this discharge, efforts are made to attempt to prevent bubbles from rising to the surface where they may be detected, or for bubbles to be released into the water column or form within the effluent discharge stream where they may also be detected.

One method of doing this is dissolving the gas into liquid. The term dissolving is at times referred to also as diffusing. Many different systems and methods, depending on application, are available for dissolving gases in liquids.

Such conventional methods and systems have generally been considered satisfactory for their intended purpose. However, there is still a need in the art for improved gas discharge systems.

SUMMARY

A discharge system includes a mixing vessel and a feedstock input in fluid communication with the mixing vessel. A solvent input is in fluid communication with the mixing vessel. A discharge output is in fluid communication with an outlet of the mixing vessel to discharge effluent.

In accordance with some embodiments, the mixing vessel includes a nozzle extending from a first side of the mixing vessel into a cavity defined by the mixing vessel. The solvent input can be in fluid communication with the nozzle to direct a solvent toward a gas pocket generated by gas entering with feedstock through the feedstock input. The solvent input can include two lines. A first of the two lines can define a flow path to the mixing vessel through the nozzle and a second of the two lines can define a flow path to the mixing vessel through an inlet on a second side of the mixing vessel. The two lines can be downstream lines and the solvent input can include a single line upstream from the two lines and includes a flow split orifice between the single line and the two lines. The second of the two lines can be a diluent line.

The inlet on the second side of the mixing vessel can be tangential to a wall of the mixing vessel to introduce swirl to fluid in the mixing vessel.

A sparger can be operatively connected to an end of the feedstock input. The mixing vessel can include a nozzle extending from a first side of the mixing vessel into a cavity defined by the mixing vessel. The sparger can extend from the end of the feedstock input into the cavity to direct incoming feedstock evenly toward the nozzle and the first side of the mixing vessel. The discharge output can include a flow restrictor downstream from the outlet of the mixing vessel.

The cavity is defined between first and second sides of the mixing vessel. The mixing vessel can include packing material in the cavity for even flow of fluid throughout the mixing vessel. The packing material can be defined between the solvent input and the discharge output. The packing material can begin at a distance from the nozzle, measured along a longitudinal axis defined between the first and second sides of the mixing vessel, equal to one and one-half times a radius of the mixing vessel. The packing material can extend through the mixing vessel along the longitudinal axis defined between the first and second sides of the mixing vessel a distance at least six times a radius of the mixing vessel. The mixing vessel can include a pair of perforated plates opposite from one another across the packing material. The sparger can extend from the end of the feedstock input into the packing material. The mixing vessel can have a larger diameter at a second end than at a first end.

In accordance with another aspect, a method for generating turbulence on a liquid surface within a discharge system to entrain gas into liquid includes supplying a mixing vessel with feedstock fluid and solvent fluid to generate a liquid mixture and a gas pocket in the mixing vessel. The method includes supplying an impinging solvent fluid through a nozzle extending from a first end of the mixing vessel to generate a roiling surface at an interface between the gas pocket and the liquid mixture and permit uptake of gas from the gas pocket into the liquid mixture. In accordance with some embodiments, generating the roiling surface includes projecting the impinging solvent fluid out of the nozzle through the gas pocket and entraining gas from the gas pocket into the liquid mixture to a depth equal to or greater than one-half a radius of the mixing vessel. Entraining gas within the liquid mixture can include entraining a gas volume ranging from 2 to 20 times a liquid volume of the impinging solvent fluid.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
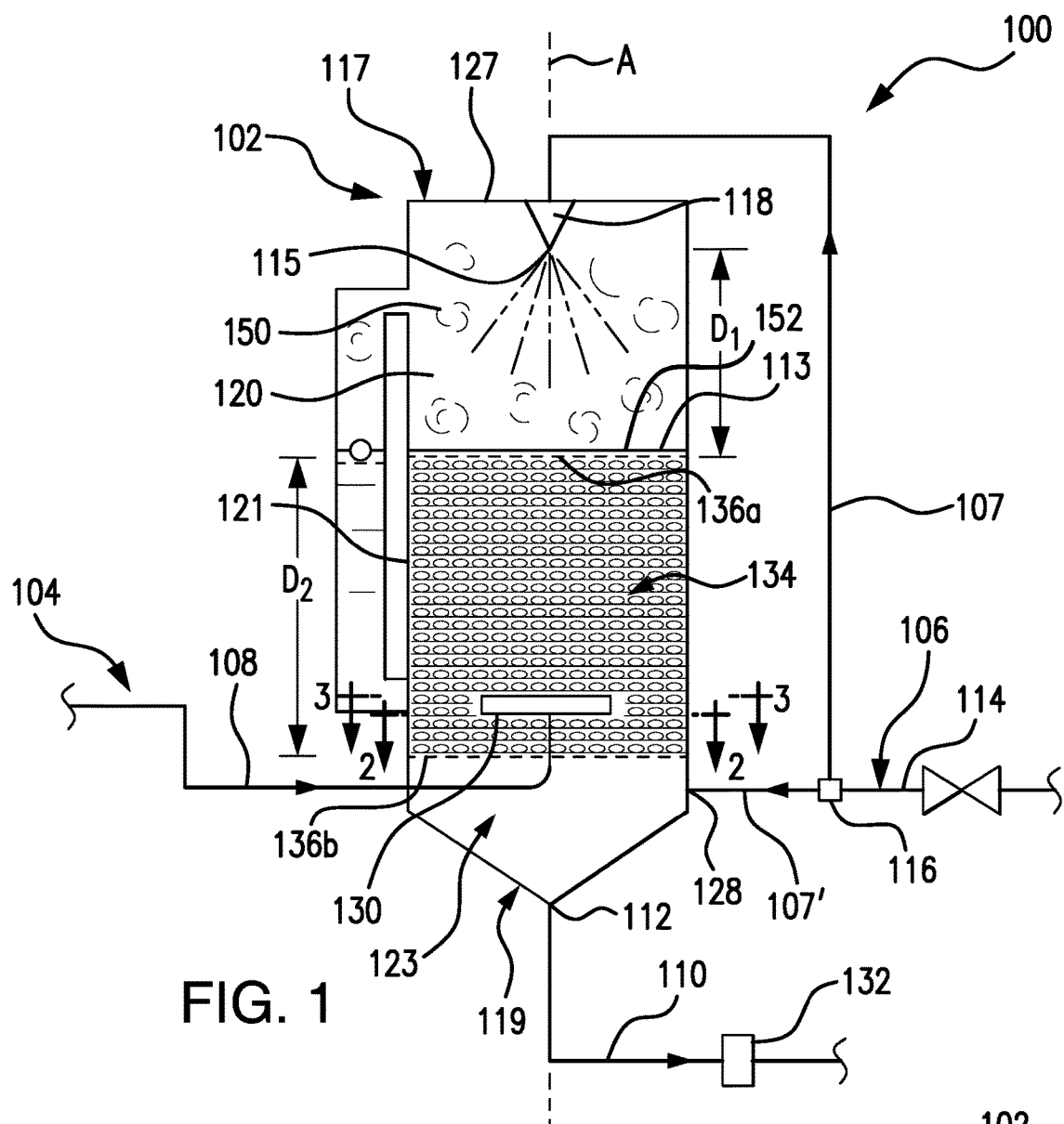
FIG. 1 is a schematic depiction of an embodiment of a discharge system constructed in accordance with the present disclosure, showing the mixing vessel having a feedstock input and a solvent input.
Figure 2:
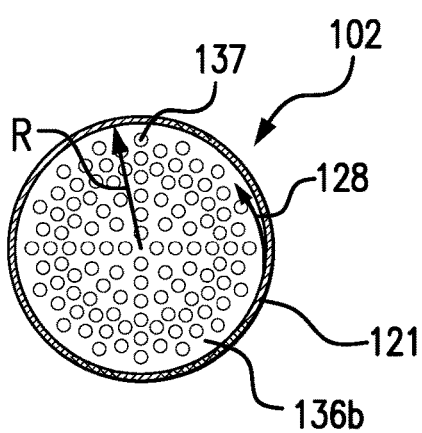
FIG. 2 is a schematic depiction of a cross section of the discharge system of FIG. 1, with the packing material removed to show the lower perforated end plate.
Figure 3:
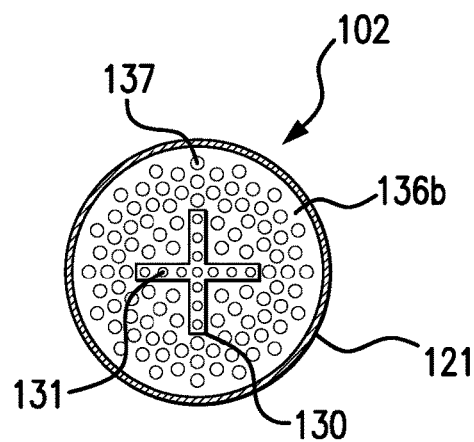
FIG. 3 is a schematic depiction of a cross section of the discharge system of FIG. 1, with the packing material removed to show the sparger.
Figure 4:
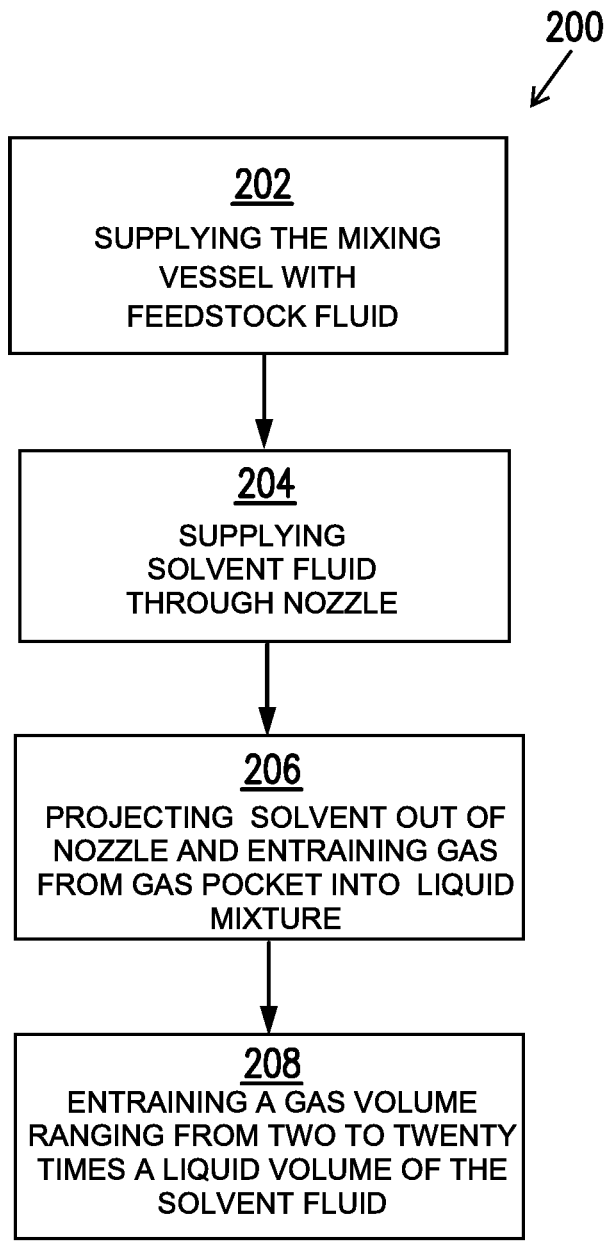
FIG. 4 is a flow chart schematically depicting a method for generating turbulence on a liquid surface within a discharge system to entrain gas into liquid.

Reference will now be made to the drawings wherein like reference numerals identify similar structural features or aspects of the subject disclosure. For purposes of explanation and illustration, and not limitation, an illustrative view of an embodiment of a discharge system in accordance with the disclosure is shown in FIG. 1 and is designated generally by reference character 100. Other embodiments and/or aspects of this disclosure are shown in FIGS. 2-4. The systems and methods described herein can be used to mix one or more soluble gas or gas and liquid feedstocks with a solvent, for example, saltwater, and discharge the solution with a known gas solubility saturation level such that the saturation level of gas in the liquid is well below that of typical bubble formation when released. This minimizes potential bubble formation from turbulent conditions or thermal hotspots after release.

As shown in FIG. 1, a discharge system 100 includes a mixing vessel 102 and a feedstock input 104 defining a feedstock flow path 108 in fluid communication with mixing vessel 102. It is contemplated that the feedstock through feedstock flow path 108 can be in the form of a gas or gas-fluid mixture and feedstock input 104 can draw from multiple feedstock sources. A longitudinal axis A is defined between first and second sides 117 and 119, respectively. A solvent input 106 is in fluid communication with mixing vessel 102. Feedstock dissolves within the solvent thereby generating an effluent discharge solution having a known gas solubility saturation. A discharge output 110 is in fluid communication with an outlet 112 of the mixing vessel 102 to discharge the effluent.

With continued reference to FIG. 1, solvent input 106 includes two lines. A first 107 of the two lines defines a flow path to mixing vessel 102 through a nozzle 118 and a second 107' of the two lines defines a flow path to mixing vessel 102 through an inlet 128 proximate to a second side 119 of mixing vessel 102, e.g. on a lower part 123 of mixing vessel 102 entering through a sidewall 121. Nozzle 118 extends from first side 117 of the mixing vessel 102 into a cavity 120 defined by mixing vessel 102. Solvent input 106 is in fluid communication with nozzle 118 to direct a solvent toward a gas pocket, indicated schematically with arcuate lines grouped together, generated by gas entering with the feedstock through feedstock input 104. Nozzle 118 provides a high velocity jet of solvent into feedstock gas and in bubbles being driven deep into the mixer fluid. It is contemplated that placement of nozzle 118 on first side 117, e.g. the top side, of mixing vessel 102 aids control of gas feed over the entire operating envelope, provides consistent uptake under pitch and roll as well as level cruise conditions, allows control of an interface 113 between the gas pocket and the liquid mixture, sustains continuous high gas uptake rate through improved kinetics, is easier to service, and provides even flow distribution across the surface area of the mixing vessel 102 making efficient use of the volume of mixing vessel 102.

With reference now to FIGS. 1 and 2, in accordance with one embodiment, nozzle 118 can produce a highly kinetic cone shaped dispersion pattern of evenly distributed liquid droplet streams across the surface area at the interface between the gas pocket and the liquid mixture. The spray pattern of nozzle 118 is substantially symmetric, as schematically indicated in FIG. 1, to fully utilize the cross sectional area of mixing vessel 102. This, in turn, generates a substantially even roiling surface in order to maximize gas uptake from gas pocket into solvent present in the liquid mixture and that spraying from nozzle 118. A roiling surface, in accordance with some embodiments, can be defined as a highly turbulent liquid/gas flow such that the impinging liquid, in this case the solvent incoming from nozzle 118, entrains gas from the gas pocket into the liquid to a depth of not less than one-half a radius R of mixing vessel 102 and preferably two times radius R. Nozzle 118 is positioned so that a tip 115 of nozzle 118 projects approximately 0.5 to 1 inch below the top of a cover 127 of mixing vessel 102 to improve initiation of a gas pocket and maintenance of the roiling surface during a given discharge of feedstock event.

With continued reference to FIGS. 1 and 2, lines 107 and 107' are downstream lines. Solvent input 106 includes a single line 114 upstream from two lines 107 and 107' and includes a flow split orifice 116 between single line 114 and two lines 107 and 107'. Inlet 128 on second side 119 of mixing vessel 102 is tangential to sidewall 121 of mixing vessel 102 to introduce swirl to fluid in the mixing vessel 102. With this substantially tangential entrance, flow swirl occurs in the bottom of mixing vessel 102, as oriented in FIG. 2, providing both dilution of solvent flow from nozzle 118 and separation of possible bubbles within lower part 123 of mixing vessel 102. Lower part 123 is defined between second side 119 of mixing vessel 102 and a bottom perforated plate 136b, described below. These bubbles then flow radially inward toward longitudinal axis A of mixing vessel 102 and may float up through perforated plates 136b and 136a toward first side 117 of mixing vessel 102. A packing material 134, described in more detail below, is above inlet 128, as originated in FIG. 1, and reduces and/or eliminates the swirl from inlet 128, resulting in more even distribution as the bubbles rise to the top.

As shown in FIGS. 1 and 3, a sparger 130 is operatively connected to an end of feedstock flow path 108 that is part of feedstock input 104. Sparger 130 extends from the end of the feedstock flow path 108 into cavity 120 to direct incoming feedstock evenly toward nozzle 118 and first side 117 of mixing vessel 102. Sparger 130 generates gas bubbles within mixing vessel 102 when feedstock is being fed into mixing vessel 102. In accordance with the embodiment shown in FIG. 3, sparger 130 is cross-shaped with holes 131 oriented upward toward first side 117 to create an even distribution of gas bubbles across mixing vessel 102 to counter downward flow, e.g. toward second side 119, of liquid solvent from nozzle 118. It is contemplated that a variety of sparger configurations and shapes can be used, for example, a spiral shape, an "X" shape, or any other suitable shape that provides even distribution over the span from front to back and side to side within mixing vessel 102.

Sparger 130 is placed near the bottom of mixing vessel 102, but within the zone of packing material 134, described below, so that additional uptake occurs in packing material 134, and small bubbles are swept from packing material 134 surface rather than allowed to accumulate and cause an increase in downward flow velocity of the solvent from nozzle 118. Sparger 130 includes holes 131 facing first side 117 of mixing vessel 102. Size and number of holes 131 is selected to maximize gas uptake at both low and high pressure conditions, and eliminate the potential for bubbles getting sucked into the effluent outlet stream. For example, holes 131 can be approximately 0.040 inches in diameter and spaced evenly along a pair of tubes that make up the cross shape. The bubbles generated need to be bubbles small enough to not impede liquid flow, yet the hole size and number of holes needs to be sufficient to keep injection pressure drop across sparger 130 within acceptable parameters.

Those skilled in the art will readily appreciate that the number of holes 131 and size of holes 131 can be selected such that about 1 psi of delta pressure is generated at the maximum volumetric flow of gas, and less than 2 psi of pressure is generated at the maximum flow of liquid-gas, for the desired feedstocks. Higher pressure drops tend to create either larger bubbles, which can result in a flow field impeding downward solvent flow, or high velocity jets of liquid which may also disturb the downward flow field. It is important to keep the downward flow field slow and even to allow small bubbles to ascend into the gas pocket at the top of mixing vessel 102. These bubbles may evolve in the solvent or feedstock, or cleave from larger bubbles at the exit of sparger 130.

As shown in FIG. 1, discharge output 110 includes a flow restrictor 132 downstream from outlet 112 of mixing vessel 102. The solvent liquid entering either nozzle 118 or inlet 128 can include other dissolved gases, e.g. atmospheric gases. The partial pressure of these other contaminate gasses over the solvent liquid is initially zero. When additional gas, such as that found in the feedstock, is added through feedstock input 104, the addition can cause some of the contaminate gas to leave the solvent and combine with the feedstock gas. Atmospheric gases, such as nitrogen and oxygen, have low solubility kinetics, and once allowed to come out of the solvent, are slow to dissolve. Further, they tend to form very small bubbles of low buoyancy that tend to be easily entrained in the discharge flow through discharge output 110 instead of being re-dissolved in the solvent and then discharged through outlet 112.

With continued reference to FIG. 1, flow restrictor 132 increases the pressure of the solution in mixing vessel 102. The resulting increase in pressure in mixing vessel 102 reduces the potential for atmospheric gases, such as nitrogen and/or oxygen, or other solvent gas contaminants from coming out of the solvent in mixing vessel 102. In accordance with some embodiments, a minimum pressure at discharge is less than four times a solvent surface pressure at ambient temperature. Flow restrictor 132 is sized to generate a delta pressure equal to four times the solvent surface pressure at ambient temperature minus the minimum pressure at outlet 112. For example, if ocean water is the solvent and the ocean surface pressure is 15 psia at ambient surface conditions, the minimum discharge pressure from the vehicle is less than 60 psia.

With reference now to FIGS. 1 and 2, mixing vessel 102 includes packing material 134 in cavity 120 for even flow of fluid throughout mixing vessel 102. Mixing vessel 102 includes perforated plates 136, an upper perforated plate 136a and a bottom perforated plate 136b, opposite from one another across packing material 134. Packing material 134 is defined between solvent input 106 and discharge output 110. Packing material 134 begins at a distance $D_1$ from tip 115 of nozzle 118 measured along longitudinal axis A of the mixing vessel 102. $D_1$ is equal to one and one-half times radius R of the mixing vessel 102. Packing material 134 extends through mixing vessel 102 along longitudinal axis A the mixing vessel 102 a distance $D_2$. $D_2$ is at least six times radius R of mixing vessel 102.

It is contemplated that packing material 134 can have an effective void volume of greater than 90%. Sparger 130 is located above the bottom of packing material 134, and a mixing zone, e.g. lower part 123, where solute diluent is added free of packing material, is located below packing material 134 prior to outlet 112. Those skilled in the art will readily appreciate that the average void space created by packing material 134 can be greater than the maximum sparger bubbles generated when feedstock gas is added, allowing the bubbles to percolate up through packing material 134 and squeeze through upper perforated plate 136a into the turbulent mixing zone, e.g. area between nozzle 118 and upper perforated plate 136a. Packing material 134 acts as a buffer a zone between outlet 112 and nozzle tip 115 to reduce or eliminate turbulence from turbulent mixing zone and balance flow across the cross sectional area of mixing vessel 102. Further, cross flow patterns are reduced, regions for bubbles to become trapped before they can flow deeper are created, and the flow velocity after mixing allows more thorough distribution of saturated solute, preventing pockets or slugs of overly saturated effluent from being discharged.

As shown in FIGS. 1 and 2, perforated plates 136a and 136b are used at the top and bottom of the zone of packing material 134 to properly position packing material 134. Each plate 136a and 136b has holes 137 equaling about 25% of the total cross sectional area, allowing low velocity relative to the nozzle turbulence, but sufficient to create pressure drop above upper perforated plate 136a resulting in fairly even flow distribution through packing material 134. The diameter of holes 137 is sized such that the solvent flow velocity in the downward direction is less than the bubble rise rate from sparger 130 so that gas entering mixing vessel 102 from sparger 130 is prevented or resisted from being entrained through bottom perforated plate 136b.

It is also contemplated that, in accordance with some embodiments, holes 137 of plates 136a and 136b are greater than the size of sparger holes 131 by more than 30%, since some pressure drop is generated in sparger 130 when feedstock gas flows, and the resulting bubbles expand as they enter cavity 120 of mixing vessel 102. Those skilled in the art will readily appreciate that all materials can be chemically compatible with the solvent and all feedstock fluids. It is also contemplated that mixing vessel 102 has a larger diameter at a lower end, e.g. proximate to inlet 128, than at first side 117.

As shown in FIG. 4, a method 200 for generating turbulence on a liquid surface within a mixing vessel, e.g. mixing vessel 102, includes supplying the mixing vessel with feedstock fluid through a feedstock input, e.g. feedstock input 104, and solvent fluid, e.g. a diluent, through an inlet, e.g. inlet 128, to generate a liquid mixture and a gas pocket in the mixing vessel, as shown by box 202. Method 200 includes supplying an impinging solvent fluid through a high dispersal nozzle, e.g. nozzle 118, extending from a first end, e.g. first side 117, of the mixing vessel to generate a roiling surface at an interface between the gas pocket and the liquid mixture and permit uptake of gas from the gas pocket into the liquid mixture, as shown by box 204. Generating the roiling surface includes projecting the impinging solvent out of the nozzle through the gas pocket and entraining gas from the gas pocket into the liquid mixture to a depth equal to or greater than one-half a radius, e.g. radius R, of the mixing vessel, as shown by box 206. Entraining gas from the gas pocket into the liquid mixture includes entraining a gas volume ranging from two to twenty times a liquid volume of the impinging solvent fluid, as indicated by box 208. The entrained gas volume can be less or more than two to twenty times the volume of the impinging solvent fluid, and can vary over a wide pressure and temperature range, and a wide range of gases or solvents. For example, liquid stream velocities from the nozzle greater than 50 ft/sec can have a greater delta pressure to achieve a roiling surface for a variety of gas-fluid and/or gas mixtures.

Embodiments of the invention provide a high surface area ratio and mechanical agitation through the nozzle to improve both soluble gas saturation and high uptake kinetics. Gas uptake is achieved by feeding the liquid solvent through the nozzle while managing the liquid level in mixing vessel 102 at an optimal gas uptake point. The methods and systems of the present disclosure, as described above and shown in the drawings, provide for discharge systems having superior properties including the ability to maximize uptake rate for a gas into a liquid solvent to form an effluent discharge solution, while still reducing and/or preventing bubbles in the effluent discharge. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A method for generating turbulence on a liquid surface within a discharge system to entrain gas into the liquid, comprising:
    supplying a mixing vessel, the mixing vessel having a first side and a second side defining a longitudinal axis therebetween, with feedstock fluid from a feedstock input and solvent fluid from an inlet on a sidewall of the mixing vessel to generate a liquid mixture and a gas pocket in the mixing vessel;
    supplying an impinging solvent fluid through a nozzle extending from the first side of the mixing vessel to generate a roiling surface at an interface between the gas pocket and the liquid mixture; and
    entraining gas within the liquid mixture to permit uptake of gas from the gas pocket into the liquid mixture.

2. The method as recited in claim 1, wherein generating the roiling surface includes projecting the impinging solvent fluid out of the nozzle through the gas pocket and entraining gas from the gas pocket into the liquid mixture to a depth equal to or greater than one-half a radius of the mixing vessel.

3. The method as recited in claim 1, wherein entraining gas within the liquid mixture includes entraining a gas volume ranging from to 2 to 20 times a liquid volume of the impinging solvent fluid.

4. The method as recited in claim 1, wherein the inlet on the sidewall of the mixing vessel and the nozzle on the first side of the mixing vessel are in fluid communication with a solvent input.

5. The method as recited in claim 1, wherein a direction of the inlet on the sidewall of the mixing vessel is tangential to the sidewall of the mixing vessel at the inlet to introduce swirl to fluid in the mixing vessel.

6. The method as recited in claim 1, wherein the nozzle is positioned above the feedstock input in a direction parallel to the longitudinal axis and the inlet on the sidewall is positioned below the feedstock input in a direction parallel to the longitudinal axis.

* * * * *